United States Patent [19]

Bexton et al.

[11] 4,330,319

[45] May 18, 1982

[54] MANUFACTURE OF UREA SULFUR FERTILIZER

[75] Inventors: Stewart G. Bexton; Gordon C. Hildred, both of Calgary; John T. Higgins, Trail; James G. Whitham, Calgary, all of Canada

[73] Assignee: Cominco Ltd., Vancouver, Canada

[21] Appl. No.: 222,466

[22] Filed: Jan. 5, 1981

[30] Foreign Application Priority Data

Dec. 24, 1980 [CA] Canada .................................. 367550

[51] Int. Cl.$^3$ .............................................. C05C 9/00
[52] U.S. Cl. ....................................... 71/28; 71/64.5; 71/64.14; 366/336
[58] Field of Search .............. 71/28, 64.5, 64.6, 64.14; 366/336–339, 176

[56] References Cited

U.S. PATENT DOCUMENTS 3,100,698 8/1963 Horsley et al. ......................... 71/28
4,302,237 11/1981 Young .................................... 71/11

*Primary Examiner*—S. Leon Bashore, Jr.
*Assistant Examiner*—Ferris H. Lander
*Attorney, Agent, or Firm*—Arne I. Fors

[57] ABSTRACT

A process is disclosed for the production of a urea sulfur fertilizer by mixing urea and molten sulfur to obtain a molten mixture and solidifying the molten mixture to obtain a homogeneous, solid, particulate urea sulfur fertilizer wherein the sulfur has particle sizes of smaller than about 100 micron. The process comprises passing molten urea and molten sulfur through a mixing device at a temperature above the melting points to produce a finely divided sulfur dispersed in urea with the molten sulfur added in amounts sufficient to produce said urea sulfur fertilizer, maintaining a pressure drop across said mixing device of at least about 200 kPa to form a homogenized melt of urea sulfur, and solidifying said homogenized melt by prilling or agglomeration.

13 Claims, No Drawings

4,330,319

MANUFACTURE OF UREA SULFUR FERTILIZER

BACKGROUND OF THE INVENTION

This invention relates to sulfur-containing fertilizer and, more particularly, to a process for the manufacture of homogeneous, particulate, urea sulfur fertilizer.

Sulfur-containing fertilizers are in ever larger demand for compensating sulfur deficiencies in the soil. Conventionally, sulfur has been applied in the form of elemental sulfur, ammonium sulfate, ammonium bisulfate, sulfides or gypsum, or in combination with other fertilizer materials such as urea. A urea sulfur product having a 40-0-0-10(S) grade was marketed for a period of time while, more recently, a sulfur coated urea has been produced.

According to Canadian Pat. No. 634,902, which issued Jan. 16, 1962 to F. A. Horsley, et al., molten urea and molten sulfur are mixed by passing molten urea and molten sulfur through a pump and the resulting mixture is fed through a tank provided with agitation into a prilling tower. Vigorous stirring is necessary to avoid phase separation. Instead of employing a prilling tower, the product may be made by other techniques such as by granulating, spherodizing or flaking. The main disadvantage of the sulfur urea product made according to these methods is that the elemental sulfur does not oxidize rapidly enough to provide nutrient sulfur that is available early in the growing season, the sulfur becoming available only in the later stages of plant growth.

According to U.S. Pat. No. 3,903,333, which issued Sept. 2, 1975 to A. R. Shirley Jr., et al., urea is coated with layers of sulfur in a rotary coating drum to produce a sulfur-coated urea. The sulfur-coated urea made according to this disclosure may be considered a slow-release fertilizer which releases both its nutrients very slowly over a long period of time. The sulfur of sulfur-coated urea does not usually become available until one year after application.

It would, therefore, be advantageous to have a sulfur-containing fertilizer which has not only a high nutrient content but also contains its sulfur in a form that is more readily and quickly available as a plant nutrient. Such a fertilizer can be applied and be effective early in the growing season, or at other times, for example, when a rapid response to the nutrients is desired.

STATEMENT OF INVENTION

We have now found that a homogeneous, solid, particulate urea sulfur can be made wherein the sulfur is more readily available as a nutrient. Thus, we have found that by homogenizing a molten mixture of dispersed sulfur in urea and forming solid particulates from the homogenized melt, a homogeneous urea sulfur fertilizer can be made wherein the sulfur is in extremely finely divided form, which is readily oxidized and available when applied to the soil.

More particularly, molten sulfur and molten urea are mixed in one or more mixing devices to form a homogeneous molten suspension or uniform dispersion of finely-divided particles of sulfur in a matrix of urea and the homogenized melt is treated to form a homogeneous, solid, particulate urea sulfur fertilizer wherein the discrete sulfur has particle sizes of less than 100 micron.

In its broadest concept, the process for making a urea sulfur fertilizer by mixing molten urea and molten sulfur to obtain a molten mixture and solidifying the molten mixture to obtain a particulate urea sulfur fertilizer comprises passing the molten urea and the molten sulfur through a mixing device at a temperature above the melting points of the urea and sulfur in relative amounts sufficient to produce said urea sulfur fertilizer, maintaining a pressure drop across said mixing device of at least about 200 kPa to form a homogenized melt of urea sulfur, and solidifying said homogenized melt to obtain a homogeneous, solid, particulate urea sulfur fertilizer wherein the sulfur has particle sizes of smaller than about 100 micron.

According to a second embodiment, there is provided a process for the production of a homogeneous, solid, particulate, urea sulfur fertilizer which comprises the steps of establishing a flow of molten urea at a temperature in the range of about 130 to 145 degrees C., establishing a flow of molten sulfur at a temperature in the range of about 120 to 150 degrees C., combining said flow of molten urea with said flow of molten sulfur, passing the combined flows through a mixing device, maintaining a pressure drop across said mixing device of at least about 200 kPa to form a homogenized melt of finely divided sulfur in urea and solidifying the homogenized melt to obtain homogeneous, solid, particulate urea sulfur fertilizer wherein the sulfur has particle sizes smaller than about 100 micron.

In a preferred embodiment, the molten urea is combined with the molten sulfur by injecting the flow of molten sulfur into the flow of molten urea in a mixing "T" to form a dispersion of molten sulfur in molten urea, a pressure differential between the flow of molten sulfur and the dispersion is maintained at a value of at least about 500 kPa, the dispersion is passed to a mixing device to homogenize the dispersion and form a homogenized melt, a pressure differential between the dispersion and the homogenized melt is maintained at a value of at least about 200 kPa and the homogenized melt is solidified to form homogeneous, solid, particulate urea sulfur fertilizer wherein the sulfur has particle sizes which are smaller than about 100 micron.

DESCRIPTION OF PREFERRED EMBODIMENTS OF THE INVENTION

The process will now be described in detail. Molten urea and molten sulfur are obtained from a source of molten urea and a source of molten sulfur, respectively. The molten urea is maintained at a temperature above its melting point of about 130 degrees C. and preferably at a temperature in the range of about 130 to 145 degrees C. The molten sulfur is also maintained at a temperature above its melting point, usually at a temperature above about 120 degrees C. The molten sulfur is maintained preferably at a temperature in the range of about 120 to 150 degrees C. An amount of molten urea and an amount of molten sulfur from their respective sources are combined in the proportions required to yield the desired grade of fertilizer. The combining may be accomplished by one of a number of methods. For example, the appropriate amounts of molten sulfur and molten urea may be supplied to a suitable pump, or to a vessel provided with agitation. The combined amounts of molten sulfur and molten urea are passed from the pump or the vessel to a suitable mixing device under critical pressure conditions to obtain a homogenized melt of finely divided molten sulfur in molten urea which yields a urea sulfur fertilizer wherein the discrete sulfur has particle sizes smaller than 100 micron. Alternatively, the molten sulfur and molten urea may be directly passed from their respective sources to a suitable mixing device.

Suitable mixing devices are those that will yield particle sizes of discrete sulfur in the urea sulfur fertilizer that are smaller than 100 micron. Mixing devices such as homogenizers and static mixers, effecting a sufficiently high pressure drop across the device, are suitable. In order to obtain the desired particle sizes of the sulfur, we have found that a pressure drop across the mixing device of at least about 200 kPa must be maintained. The use of a static mixer such as a BLENDREX (Trade Mark) Motionless Mixer or Ross (Trade Mark) Motionless Mixer, wherein, for example the combined flow passes through one or more contained helical paths, will yield the desired results. The static mixer must effect a pressure differential between the combined flow of molten sulfur and urea, and the resulting homogenized melt of at least about 200 kPa, preferably at least about 350 kPa, and most preferably at least about 500 kPa. The pressure drop across the mixing device may be as high as 1500 kPa or higher. The higher the pressure drop is, the higher the degree of homogenization will be, but also the higher the amount of energy is that will be required to obtain the pressure drop.

According to the preferred embodiment of the process of the invention separate flows of molten urea and molten sulfur are established, the flows are combined to form a suspension of molten sulfur in molten urea and the suspension is passed to the suitable mixing device to form a homogenized melt. Molten urea is pumped from a source of molten urea by a suitable pump to form a flow of molten urea. The temperature of the molten urea is maintained above the melting point of urea at above about 130 degrees C. and is preferably maintained at a value in the range of about 135 to 145 degrees C. Molten sulfur is pumped from a source of molten sulfur by a suitable pump to establish a flow of molten sulfur. The sulfur is maintained at a temperature above its melting point in the range of about 120 to 150 degrees C., preferably at a temperature similar to that of the molten urea in the range of about 135 to 145 degrees C. The flow rate and pressure of the flow of urea and those of the flow of sulfur are controlled separately and in the relation to each other, as will become apparent, such that the desired quantity of fertilizer can be produced, the amount of sulfur is sufficient to obtain the desired grade of fertilizer and the sulfur in the fertilizer has particle sizes smaller than 100 micron. The separate flows of molten urea and molten sulfur are combined and the combined flows are passed through a suitable mixing device to obtain a homogenized melt of finely divided molten sulfur in urea.

The combining of the flow of molten urea and the flow of molten sulfur can be accomplished by means of a pre-mixing device such as an injector or a device generally known as a mixing elbow or a mixing "T", which may have a fixed or variable size orifice, whereby a dispersion of molten sulfur in molten urea is formed. The use of a mixing "T" is preferred. The dispersion is passed to the suitable mixing device to obtain the homogenized melt as described.

In the mixing "T", the flow of molten sulfur is injected into the flow of molten urea through an orifice. The dimensions of the mixing "T" must be chosen such that the rates of flow of sulfur and urea can be accommodated. The size of the orifice must be such that a pressure differential exists between the pressure of the flow of sulfur and that of the resulting dispersion which pressure differential is sufficient to effect the desired degree of dispersion of sulfur in urea. By increasing the pressure of the flow of molten sulfur, the pressure drop across the orifice increases which results in a finer dispersion of the sulfur and also in the injection of a greater amount of sulfur with a resulting higher sulfur content and smaller sulfur particle sizes in the urea sulfur fertilizer. The degree of dispersion is also affected by the pressure differential between the pressure of the flow of molten urea and the pressure of the resulting dispersion.

The pressure differential across the mixing "T", i.e., the difference between the pressure of the flow of urea and that of the dispersion, is not critical and may be, for example, 200 kPa. The pressure differential between the pressure of the flow of molten sulfur and the pressure of the dispersion, i.e. the pressure drop across the orifice, should be greater than the pressure differential across the mixing "T" and is preferably at least about 500 kPa, most preferably at least about 900 kPa.

According to another preferred embodiment of the process of the invention, the combining of the flow of molten sulfur with the flow of molten urea may be accomplished in a mixing "T" positioned before the urea pump. Accordingly, the flow of molten urea is obtained from the source of molten urea at a temperature in the range of about 135 to 145 degrees C. and is directed through the mixing "T". Molten sulfur is pumped from its source at a temperature in the range of about 120 to 150 degrees C., preferably 135 to 145 degrees C., and is injected into the flow of molten urea through the orifice in the mixing "T". The combined flow of the dispersion of molten sulfur in molten urea is then passed through the urea pump and subsequently through the mixing device to homogenize the dispersion. This method has the additional advantage of requiring lower pump pressure for the molten sulfur as the pressure of the urea flow before the urea pump can be very low such as, for example, the pressure of gravity flow, while still maintaining the desired pressure drop of at least 500 or 900 kPa across the orifice of the mixing "T". The urea pump will subsequently boost the pressure of the dispersion to allow the required pressure drop across the mixing device to effect homogenization of the dispersion.

The dispersion of molten sulfur in molten urea is passed to the mixing device, as described hereinabove, to homogenize the dispersion, resulting in a further reduction in the sizes of the dispersed sulfur and formation of a homogenized melt, which, upon solidification, will yield urea sulfur fertilizer wherein the sulfur will have particle sizes smaller than 100 micron.

All apparatus that contain molten sulfur and/or urea are steam-traced, internally or externally, or steam-jacketed and insulated to maintain the desired temperatures and to prevent any premature solidification of molten material.

The homogenized melt is subsequently solidified into solid particulates of homogeneous urea sulfur fertilizer wherein the sulfur has particle sizes smaller than 100 micron. The solidification may be accomplished by any one of a number of methods including prilling and agglomeration processes known in the art. Agglomeration processes include granulation in a rotating drum, an inclined rotating pan, or a fluidized bed. Solidification by prilling is carried out in a cooling gas in a tower.

Although the homogenized melt may not separate into its components, it is desirable to maintain the residence time of the homogenized melt prior to solidification as short as possible. Thus, the time that elapses between the homogenized melt leaving the mixing device and the melt leaving the spraying means in the solidification means should preferably be as short as possible. We have found that a residence time of the homogenized melt between homogenizing and solidifying in the order of about 10 seconds or less will ensure that the particle sizes of the sulfur in the fertilizer product are smaller than 100 micron. The solidified particles are subsequently screened and a product of desired particle sizes is recovered. The product is a homogeneous, solid, particulate urea sulfur fertilizer comprising a uniform dispersion of finely divided particles of sulfur in a urea matrix, the sulfur having particle sizes smaller than 100 micron.

To reduce the tendency of caking of the solid urea sulfur fertilizer particulates, a suitable anti-caking agent may be used. A small amount of a suitable agent may be applied to the solidified particles or to the product size fraction as desired, by coating or spraying. Alternatively, a suitable anti-caking agent may be added either to the source of molten urea, or to the flow of molten urea prior to either the urea pump, the combining of the urea with the sulfur, or the mixing device.

The grades of the homogeneous, solid, particulate, urea sulfur fertilizer can vary over a broad range. Grades with as little as a few percent sulfur, or with as much as about 20 percent sulfur, e.g., a 37-0-0-20 grade, can be made by the process of the invention. For practical and economical considerations the lowest grade would be, for example, a 43-0-0-4 composition. Grades with more than 20% S are difficult to produce because of the very high sulfur pressures required to obtain sufficient sulfur in the combined melts and also because the solidification results normally in a small portion of the fertilizer being larger than the desired product. The recycling of the oversize portion may create problems when melted, or create an explosion hazard when reduced in size by mechanical means.

The preferred embodiments of the process according to the invention will now be illustrated by means of the following non-limitative examples.

EXAMPLE 1

Molten urea having a temperature of 140 degrees C. was pumped from a source of molten urea to a mixing "T" at a rate of 7070 L/h and under an absolute pressure of 1187 kPa. Molten sulfur having a temperature of 140 degrees C. was pumped from a source of molten sulfur to the mixing "T" at a rate of 524 L/h and an absolute pressure of 1815 kPa. The sulfur was injected into the urea through an orifice with a diameter of 3.175 mm. The dispersion of sulfur in urea from the mixing "T" had a temperature of 140 degrees C. and a pressure of 918 kPa. The dispersion was passed through a 2×6 Ross (Trade Mark) Motionless Mixer with a pressure drop rating of 500 kPa and homogenized. The homogenized melt having a temperature of 140 degrees C. and a pressure of 435 kPa was reduced in pressure to 262 kPa and passed to the spray nozzles of an inclined, rotating granulating drum. The homogenized melt was sprayed onto a continuously moving bed and into a falling curtain of recycled urea sulfur fines. Cooling air was passed through the granulating drum countercurrent to the direction of movement of the moving bed. The urea sulfur particulates were discharged from the drum, cooled to a temperature of less than 80 degrees C. and separated into a product size fraction of −6 to +14 mesh (Tyler Standard Screen Series). Product was recovered at a rate of 9437 kg/h. The oversize particulates were crushed and returned to the granulating drum together with the undersize particulates at a rate of 18000 kg/h.

The product had a grade of 43.6-0-0-6.3. A representative sample of the product was analyzed to determine the particle sizes of the sulfur. The particle sizes are given in Table I.

TABLE I

| Particle Size Diameter in Microns | Sulfur Particles Smaller than Stated Size in % |
|---|---|
| 100 | 100.00 |
| 59.10 | 100.00 |
| 46.91 | 92.78 |
| 29.55 | 25.39 |
| 18.62 | 3.73 |
| 11.73 | 1.26 |
| 5.86 | 0.76 |
| 2.33 | 0.00 |

EXAMPLE 2

The test described in Example 1 was repeated using a mixing "T" with an orifice diameter of 4.76 mm. Urea was pumped to the mixing "T" at a rate of 8460 kg/h, a temperature of 145 degrees C. and a pressure of 1050 kPa. Sulfur was pumped to the mixing "T" at a rate of 997 kg/h, a temperature of 145 degrees C. and a pressure of 1400 kPa. The sulfur-in-urea dispersion having a pressure of 700 kPa was passed through the static mixer at a temperature of 145 degrees C. and a pressure drop of 350 kPa. The homogenized melt was granulated as described in Example 1. Product was recovered at a rate of 9495 kg/h and the recycle rate of undersize and crushed oversize particulates was 19000 kg/h.

The product had a grade of 41.6-0-0-10.5, a poured bulk density of 790 kg/m$^3$, a moisture content of 0.05% by weight and a biuret content of 1.7%. The product had the following particle size ranges (Tyler Standard Screen Series) −4 to +6 mesh: 0.1%, +8 mesh: 73.7%, +10 mesh: 99.7%, +14 mesh: 100%. The pH of a 10% aqueous solution was 7.1.

A representative sample of the product was analyzed to determine the sulfur particle sizes using a Coulter Counter (Trade Mark). The particle sizes are given in Table II.

The urea sulfur fertilizer made according to these examples was subjected to agronomic tests to determine the availability of the sulfur. These tests showed that at least 50% of the sulfur was available as nutrient within three weeks.

TABLE II

| Particle Size Diameter in Microns | Sulfur Particles Smaller than Stated Size in % |
|---|---|
| 100 | 100.00 |
| 59.10 | 85.10 |
| 46.91 | 68.72 |
| 29.55 | 24.76 |
| 18.62 | 5.89 |
| 11.73 | 1.30 |
| 5.86 | 0.28 |
| 2.33 | 0.00 |

EXAMPLE 3

Molten urea having a temperature of 140 degrees C. was passed from a source of molten urea under gravity to a mixing "T" at a rate of 7070 L/h and under absolute pressure of 15 kPa. Molten sulfur having a temperature of 140 degrees C. was pumped from a source of molten sulfur to the mixing "T" at a rate of 524 L/h and an absolute pressure of 1100 kPa. The sulfur was injected into the urea through an orifice with a diameter of 3.175 mm. The dispersion of sulfur in urea from the mixing "T" was passed through a pump and subsequently passed, at a temperature of 140 degrees C. and a pressure of 850 kPa, through a 2×6 Ross (Trade Mark) Motionless Mixer with a pressure drop rating of 500 kPa and homogenized. The homogenized melt having a temperature of 140 degrees C. and a pressure of 350 kPa was reduced in pressure to 262 kPa and passed to the spray nozzles of an inclined, rotating granulating drum. The homogenized melt was sprayed onto a continuously moving bed and into a falling curtain of recycled urea sulfur fines. Cooling air was passed through the granulating drum countercurrent to the direction of movement of the moving bed.

The urea sulfur particulates were discharged from the drum, cooled to a temperature of less than 80 degrees C. and separated into a product size fraction of −6 to +14 mesh (Tyler Standard Screen Series). Product was recovered at a rate of 9437 kg/h. The oversize particulates were crushed and returned to the granulating drum together with the undersize particulates at a rate of 18000 kg/h. The final product was analyzed and the particle sizes of the sulfur were smaller than 100 micron.

It will be understood of course that modifications can be made in the embodiments of the invention described and illustrated therein without departing from the scope and purview of the invention as defined in the appended claims.

What we claim as new and desire to protect by Letters Patent of the United States is:

1. A process for the production of a urea sulfur fertilizer by mixing urea and molten sulfur to obtain a molten mixture and solidifying the molten mixture to obtain a particulate urea sulfur fertilizer comprising passing the molten urea and the molten sulfur through a mixing device at a temperature above the melting points of the molten urea and the molten sulfur in amounts sufficient to produce said urea sulfur fertilizer, maintaining a pressure drop across said mixing device of at least about 200 kPa to form a homogenized melt of urea sulfur, and solidifying said homogenized melt to obtain a homogeneous, solid, particulate urea sulfur fertilizer wherein the sulfur has particle sizes of smaller than about 100 micron.

2. A process for the production of a homogeneous, solid, particulate, urea sulfur fertilizer which comprises the steps of establishing a flow of molten urea at a temperature in the range of about 130 to 145 degrees C., establishing a flow of molten sulfur at a temperature in the range of about 120 to 150 degrees C., combining said flow of molten urea with said flow of molten sulfur, passing the combined flows through a mixing device, maintaining a pressure drop across said mixing device of at least about 200 kPa to form a homogenized melt of finely divided sulfur dispersed in urea, and solidifying the homogenized melt to obtain homogeneous, solid, particulate urea sulfur fertilizer wherein the sulfur has particle sizes smaller than about 100 micron.

3. A process as claimed in claim 2, wherein the molten urea is combined with the molten sulfur by injecting the flow of molten sulfur into the flow of molten urea in a pre-mixing device to form a dispersion of molten sulfur in molten urea, a pressure differential between the flow of molten sulfur and the said dispersion is maintained at a value of at least about 500 kPa, the dispersion is passed to a mixing device to homogenize the dispersion and form a homogenized melt, a pressure differential between the dispersion and the homogenized melt is maintained at a value of at least about 200 kPa, and the homogenized melt is solidified to form homogeneous, solid, particulate urea sulfur fertilizer wherein the sulfur has particle sizes which are smaller than about 100 micron.

4. A process as claimed in claim 3, wherein the pre-mixing device is a mixing "T" or a mixing elbow.

5. A process as claimed in claim 3, wherein the pressure differential between the pressure of the flow of molten sulfur and the pressure of the dispersion of sulfur in urea is at least about 900 kPa.

6. A process as claimed in claim 3, wherein the pressure differential between the pressure of the flow of urea and the dispersion is maintained less than the pressure differential between the flow of molten sulfur and the pressure of the dispersion.

7. A process as claimed in claim 1, 2 or 3, wherein the pressure drop across said mixing device is at least about 350 kPa.

8. A process as claimed in claim 1, 2 or 3, wherein the molten urea and the molten sulfur are maintained at temperatures in the range of about 135 to 145 degrees C. and the pressure drop across said mixing device is at least about 350 kPa.

9. A process as claimed in claim 1, 2 or 3, wherein the pressure drop across said mixing device is at least about 500 kPa.

10. A process as claimed in claim 1, 2 or 3, wherein the temperature of the molten urea and the temperature of the molten sulfur are in the range of about 135 to 145 degrees C. and wherein the pressure drop across said mixing device is at least about 500 kPa.

11. A process as claimed in claim 1, 2 or 3, wherein the residence time of the homogenized melt between homogenizing and solidifying is about 10 seconds or less.

12. A homogeneous, solid, particulate urea sulfur fertilizer comprising a uniform dispersion of finely divided particles of sulfur in a urea matrix, said sulfur having particle sizes which are smaller than about 100 micron produced according to the process of claim 1, 2 or 3.

13. A homogeneous, solid, particulate urea sulfur fertilizer comprising a uniform dispersion of finely divided particles of sulfur in a urea matrix, said sulfur having particle sizes which are smaller than about 100 micron.

* * * * *